United States Patent [19]

Hirose et al.

[11] Patent Number: 5,094,130
[45] Date of Patent: Mar. 10, 1992

[54] SHIFT CONTROL SYSTEM FOR AUTOMATIC POWER TRANSMISSION WITH FEATURE OF SUPPRESSION OF SHIFT SHOCK DURING 4-2 DOWNSHIFT

[75] Inventors: Ikuo Hirose, Shizuoka; Koichi Hayasaki; Hirofumi Okahara, both of Kanagawa, all of Japan

[73] Assignees: JATCO Corporation, Shizuoka; Nissan Motor Company, Limited, Kanagawa, both of Japan

[21] Appl. No.: 456,180

[22] Filed: Dec. 26, 1989

[30] Foreign Application Priority Data

Dec. 26, 1988 [JP] Japan ................................ 63-330492

[51] Int. Cl.$^5$ ............................................ B60K 41/06
[52] U.S. Cl. ........................................ 74/869; 74/866
[58] Field of Search .................. 74/866, 867, 868, 869; 364/424.1

[56] References Cited

U.S. PATENT DOCUMENTS

| | | | |
|---|---|---|---|
| 4,662,249 | 5/1987 | Miki et al. | 74/869 |
| 4,730,521 | 3/1988 | Hayasaki et al. | 74/868 X |
| 4,807,496 | 2/1989 | Hayasaki et al. | 74/866 |
| 4,856,383 | 8/1989 | Rosen | 74/869 |
| 4,867,194 | 9/1989 | Hayasaki et al. | 74/869 X |

*Primary Examiner*—Leslie A. Braun
*Assistant Examiner*—Benjamin Levi
*Attorney, Agent, or Firm*—Ronald P. Kananen

[57] ABSTRACT

A shift control system for an automatic power transmission, utilizes a logic for utilizing a shifting sequence for operating a plurality of shift solenoids for establishing valve operation in a plurality of shift valves in a predetermined order and for draining more than one speed servo pressure. The shifting sequence being a 4-2 downshift, whereby the shift solenoids are controlled such that the second speed gear ratio is shifted to via the first speed gear ratio.

6 Claims, 6 Drawing Sheets

FIG. 2

| | R/C 18 | H/C 20 | F/C 22 | OR/C 24 | BAND SERVO 2ND APPLY | BAND SERVO 3RD RELIEF | BAND SERVO 4TH APPLY | F/O·C 30 | L/O·C 29 | L&R/B 26 | REMARKS |
|---|---|---|---|---|---|---|---|---|---|---|---|
| P | | | | | | | | | | | PARK |
| R | ○ | | | | | | | | | ○ | REVERSE |
| N | | | | | | | | | | | NEUTRAL |
| D 1 | | | ○ | ◉ | | | | ● | ● | | AUTO |
| D 2 | | | ○ | ◉ *1 | ○ | | | ● | | | 1→2→ |
| D 3 | | ○ | ○ | ◉ | *2⊗ | ⊗ | | ● | | | 3→4 |
| D 4 | | ○ | ○ | | *3⊗ | ⊗ | ○ | ● | | | |
| 2 1 | | | ○ | ◉ | | | | ● | ● | | AUTO |
| 2 2 | | | ○ | ○ | ○ | | | ● | | | 1→2 |
| 1 1 | | | ○ | ○ | | | | ● | | ○ | AUTO |
| 1 2 | | | ○ | ○ | ○ | | | ● | | | 1→2 |

:*1 ACTIVE ONLY WHEN OVER-DRIVE SWITCH IS OFF
*2 PRESSURE IS SUPPLIED BOTH FOR 28a AND 28b, BECAUSE OF WIDER EFFECTIVE AREA B/B IS NOT ENGAGED
*3 AT THE STATE OF 2, PRESSURE IS SUPPLIED TO 28c TO CAUSE B/B ENGAGED
○ — ENGAGED
◉ — TO BE ENGAGED TO THROTTLE OPEN ANGLE SMALLER THAN A GIVEN MAGNITUDE
● — ACTIVE DURING ACCELERATION
○ — ENGAGED BUT NOT IN EFFECT FOR TRANSMISSION OF POWER
⊗ — ENGAGED AT THROTTLE ANGLE SMALLER THAN GIVEN MAGNITUDE BUT NOT EFFECTIVE FOR ENGINE BRAKING

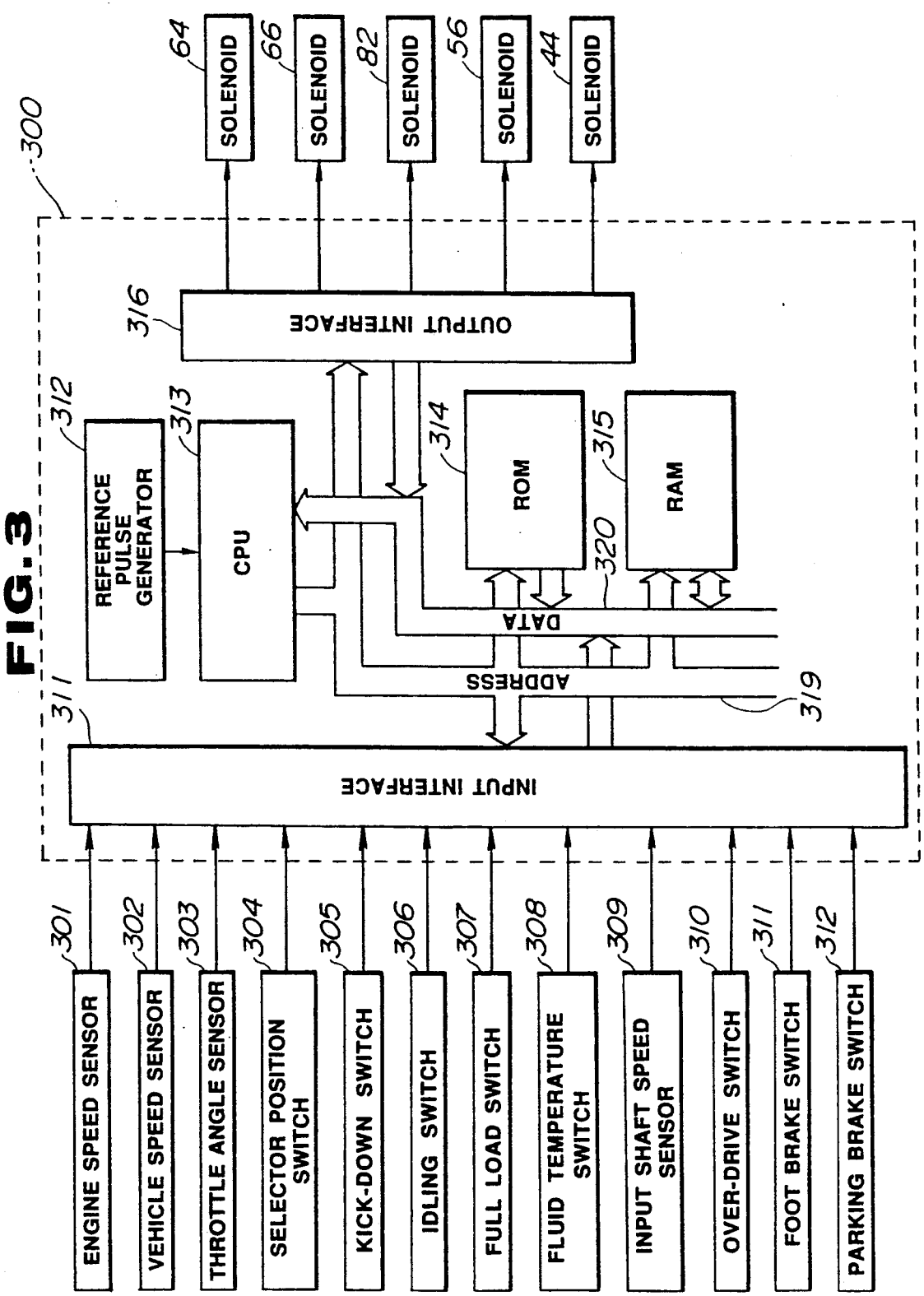

| SOLENOID / RANGE | A | B |
|---|---|---|
| 1ST | ○ | ○ |
| 2ND | × | ○ |
| 3RD | × | × |
| 4TH | ○ | × |

○ --- ON
× --- OFF (DRAIN)

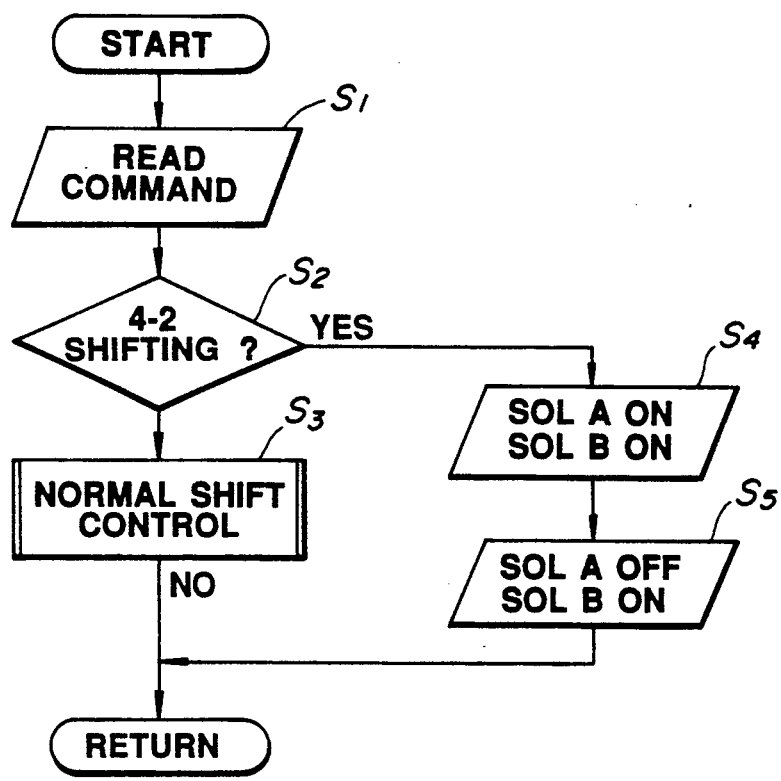

SHIFT CONTROL SYSTEM FOR AUTOMATIC POWER TRANSMISSION WITH FEATURE OF SUPPRESSION OF SHIFT SHOCK DURING 4-2 DOWNSHIFT

BACKGROUND OF THE INVENTION

1. Field of the Invention

The present invention relates generally to an electronic control system for an automatic power transmission for an automative vehicle, for controlling selection of a speed ratio according to a vehicle driving condition. More specifically, the invention relates to a shift control system for the automatic power transmission, which can reduce or suppress shift shock caused by abrupt engine speed and torque variation.

2. Description of the Background Art

Automatic power transmission control systems have been developed in various fashions. For example, "Nissan Full-Range Electronically Controlled Automatic Transmission RE4R01A Service Manual", published by Nissan Motor Co., Ltd., on March 1987, shows an electronically controlled automatic power transmission. Also, similar electronically controlled automatic power transmission has been disclosed in "NISSAN SERVICE MANUAL No. 578" pages C-1 through C-60, published by Nissan Motor Co., Ltd. For such electronically controlled automatic power transmission systems, elimination of shift shock which is otherwise caused by torque fluctuation upon a shifting up and a shifting down operation and also by a lag in apply and release timing of friction elements. In order to select an appropriate speed ratio, the automatic power transmission system employs a plurality of shifting control solenoids. For example, in the system disclosed in the aforementioned prior publications, first and second shift solenoids are active in response to a shift control system for an electronic transmission control unit for generating signal pressures for causing a shifting operation for selecting a speed ratio over four forward speed ratios and a single reverse ratio. A band brake provides a fourth speed servo apply pressure, a third speed servo relief pressure and a second speed servo apply pressure. When down-shifting from a fourth speed ratio to a second speed ratio is to take place, the fourth speed servo apply pressure and the third speed servo relief pressure are decreased. If the fourth speed servo apply pressure is released in advance of releasing of the third speed servo relief pressure, the position of the band brake is switched in a sequence ON-OFF-ON to cause shifting shock. In order to avoid this, a 4-2 sequence valve (first timing valve) is provided so as to assure that the releasing of the third speed servo relief pressure occurs in advance of releasing of the fourth speed servo apply pressure. In case that the 4-2 sequence valve is solely employed, shifting of the third speed ratio to the second speed ratio is performed in an order of 3rd-4th-2-nd/. In order to avoid this, a 4-2 relay valve (second timing valve) is provided. In this system, two timing control valves are required for adjusting shifting timing from the fourth speed ratio to the second speed ratio and thus causes an increase in the number of parts resulting in a high cost.

Another electronic control system for the automatic power transmission has been disclosed in Japanese Patent First Publication 55-60747. This publication proposes use of a multi-stage shift solenoid for eliminating shifting shock due to lag of engaging and releasing timing of the friction elements. This publication also may incur a high cost for a multi-stage shift valve. Furthermore, since a multi-stage shift valve is relatively bulky, the overall hydraulic control unit becomes bulky causing difficulty in installation on the automatic power transmission casing.

SUMMARY OF THE INVENTION

Therefore, it is an object of the present invention to provide a shift control system for an automatic power transmission which can eliminate shift shock with a reduced number of valves and thus make a hydraulic circuit simple and less-expensive.

In order to accomplish the aforementioned and other objects, a shift control system for an automatic power transmission, according to the present invention, utilizes a logic for utilizing a shifting sequence for operating a plurality of shift solenoids for establishing valve operation in a plurality of shift valves in a predetermined order and for draining more than one speed servo pressure.

According to one aspect of the invention, a shift control system for an automatic power transmission comprises:

a plurality of gear elements selectively engaged and released for selectively establishing a plurality of speed ratios;

frictional control elements which are hydraulically operable and associated with the gear elements for selectively engaging and releasing the gear elements for establishing a selected one of a plurality of speed ratios;

a hydraulic unit for controlling the frictional control elements depending upon a command for a desired transmission speed ratio, the hydraulic unit including a plurality of shift valves for controlling selectively supplied control pressure for the frictional control elements;

a plurality of shift solenoids for operating the shift valves for establishing a selected one of the speed ratios corresponding to a commanded speed ratio; and an electronic control unit for controlling operation of the shift solenoids for energizing and deenergizing the latter in combination according to a predetermined shift schedule for establishing the commanded speed ratio, the electronic control unit detecting a specific command requiring a shifting operation for more than one speed ratio from the instantaneous speed ratio for controlling the shift solenoids for establishing a first combination of energized an solenoid and a deenergized solenoid for temporarily establishing an intermediate speed ratio position by operating associated friction control elements to the position corresponding to the temporarily selected speed ratio and subsequently controlling the shift solenoid for establishing a second combination of an energized solenoid and a deenergized solenoid for establishing the commanded speed ratio by operating associated friction control elements to the position corresponding to the commanded speed ratio.

In the preferred construction, the hydraulic unit includes first, second and third shift valves for selectively establishing forward four speed ratios, and the first, second third shift valves being operated for establishing a desired speed ratio by means of first and second shift solenoids. Also, the electronic control unit may be responsive to a down-shifting command requiring down-shifting from the instantaneous speed ratio to more than one lower speed ratio for performing a down-shifting operation for establishing the commanded speed ratio via the intermediate speed ratio. In the specific implementation, the electronic control unit may detect a 4-2 shifting command requiring a down-shifting from a fourth speed ratio to a second speed ratio and performs a down shifting operation to the second speed ratio via a first speed ratio as the intermediate speed ratio.

According to another aspect of the invention, a shift control system for an automatic power transmission comprises:

a plurality of planetary gear sets selectively engaged and released for selectively establishing a plurality of speed ratios;

frictional control elements which are hydraulically operable and associated with the planetary gear sets for selectively engaging and releasing the gear elements for establishing a selected one of a plurality of speed ratios;

a hydraulic unit for controlling the frictional control elements depending upon a command for a desired transmission speed ratio, the hydraulic unit including first second and third shift valves for controlling and selectively supplying control pressure for the frictional control elements;

first and second shift solenoids for operating the shift valves for establishing a selected one of the speed ratios corresponding to a commanded speed ratio; and an electronic control unit for controlling operation of the first and second shift solenoids for energizing and deenergizing the latter in combination according to a predetermined shift schedule for establishing the commanded speed ratio, the electronic control unit detecting a specific down-shifting command requiring a down-shifting operation for more than one speed ratio from the instantaneous speed ratio for controlling the first and second shift solenoids for establishing a first combination for temporarily establishing an intermediate speed ratio position by operating associated friction control elements to the position corresponding to the temporarily selected speed ratio and for draining control pressure from the frictional control elements which are irrelevant for the commanded speed ratio and subsequently controlling the first and second shift solenoids for establishing a second combination for establishing the commanded speed ratio by operating associated friction control elements to the position corresponding to the commanded speed ratio.

In a preferred implementation, the electronic control unit may detect a 4-2 shifting command requiring a down-shifting from a fourth speed ratio to a second speed ratio and perform down shifting operation to the second speed ratio via a first speed ratio as the intermediate speed ratio at which the control pressure for the third speed ratio is drained.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and drawings only.

In the drawings:

FIG. 2 is a chart showing active components of the power transmission of FIG. 1, which are active at a respective operational range;

FIG. 3 is a block diagram of the preferred embodiment of a shifting control system according to the present invention;

FIG. 7 is a flowchart of a shift control routine to be executed by an electronic control unit in the preferred embodiment of the shift control system; and FIG. 8 is a chart showing operation of a shift solenoid at 4-2 shifting operation.

DESCRIPTION OF THE PREFERRED EMBODIMENT

Figure 1:
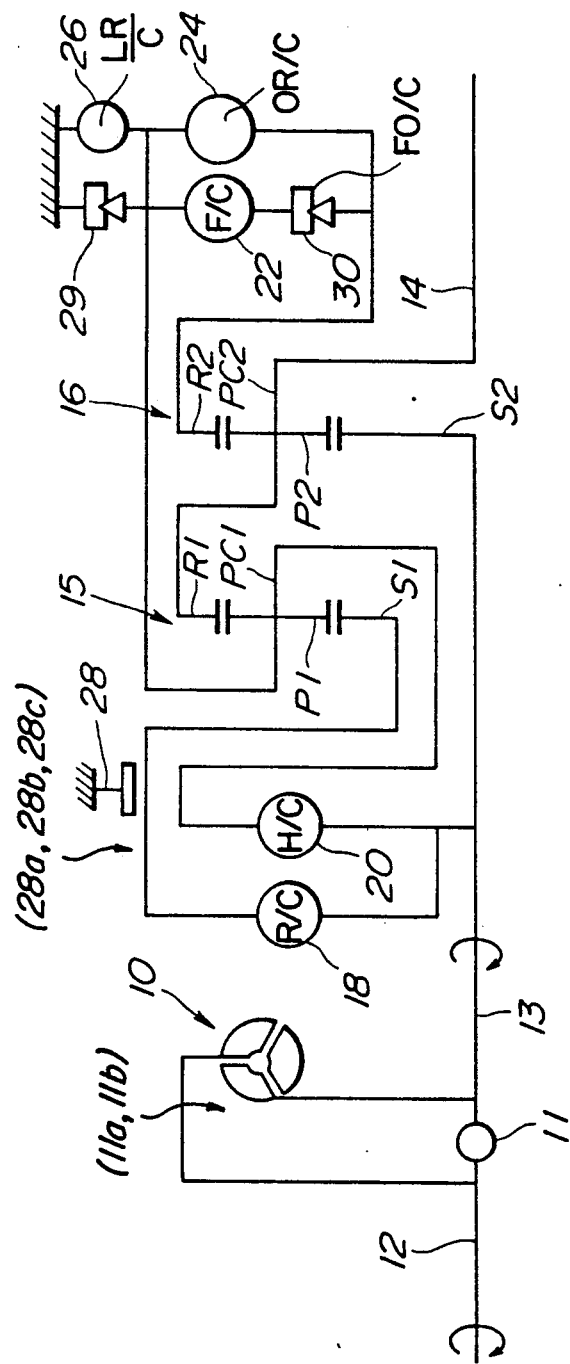
FIG. 1 is a skeleton chart of an automatic power transmission to which the preferred embodiment of a shifting control system, according to the present invention, is applicable.

Referring now to the drawings, particularly to FIG. 1, there is shown an automatic power transmission having a power train of four forward speed ratios and one reverse speed ratio. The power transmission mechanism includes an input or turbine shaft 13 connected to an output shaft 12 of an automative internal combustion engine as a prime mover, via a torque converter 10. The power transmission mechanism also includes an output shaft 14 for transmitting driving torque to a final drive. The torque converter 10 has a pump impeller, a turbine runner and a stator. The pump impeller is connected to the engine output shaft 12. On the other hand, the turbine runner is connected to the input shaft 13. The pump impeller is also connected to an oil pump for driving the latter. Between the input shaft 13 and the output shaft 14, a first planetary gear set 15, a second planetary gear set 16, a reverse clutch (R/C) 18, a high clutch (H/C) 20, a forward clutch (F/C) 22, an overrun clutch (OR/C) 24, a low-and-reverse brake (LR/B) 26, a band brake (B/B) 28, a low one-way clutch (LO/C) 29 and a forward one-way clutch (FO/C) 30. The torque converter incorporates a lock-up clutch 11. On the other hand, the first planetary gear set 15 includes a sun gear $S_1$, a ring gear $R_1$, a pinion $P_1$ and a carrier $PC_1$ supporting the pinion. The second planetary gear set 16 includes a sun gear $S_2$, a ring gear $R_2$, a pinion $P_2$ and a carrier $PC_2$ supporting the pinion.

The carrier $PC_1$ supporting the pinion $P_1$ is so designed as to be connectably associated with the input shaft 13 via the high clutch (H/C) 20. The carrier $PC_1$ is also connected to the ring gear $R_2$ of the second planetary gear set 16 via the forward clutch (F/C) 22 and the forward one-way clutch (FO/C) 30 which is coupled with the forward clutch in series, or in the alternative, via the forward clutch (F/C) 22 and the overrun clutch (OR/C) 24 which is provided in parallel to the forward one-way clutch (FO/C) 30. The carrier $PC_1$ is adapted to be anchored by the low and reverse brake (L&R/B) 26 and its reverse rotation is prevented by the low one-way clutch (LO/C) 29. The sun gear $S_1$ of the first planetary gear set 15 is so designed as to be connectably associated with the input shaft 13 via the reverse clutch (R/C) 18. The sun gear $S_2$ of the second planetary gear set 16 is constantly connected to the input shaft 13. The ring gear $R_1$ of the first planetary gear set 15 and the carrier $PC_2$ of the second planetary gear set 16 are constantly connected to the output shaft 14. The ring gear $R_1$ is integrally connected with the carrier $PC_2$ of the second planetary gear set 18. The sun gear $S_2$ of the second planetary gear set 16 is connected to the input shaft 13. The ring gear $R_2$ is connectably associated with the carrier $PC_1$ via the overrun clutch (OR/C) 24. In order to establish a predetermined drive relation, the forward one-way clutch (FO/C) 30 and the forward clutch (F/C) 22 are arranged between the carrier $PC_1$ and the ring gear $R_2$ of the second planetary gear set 16. Engagement of the floward clutch (F/C) 22 causes the forward one-way clutch (FO/C) 30 to connect the ring gear $R_2$ with the carrier $PC_1$ in the reverse rotational direction.

The low and reverse brake (L&R/B) 26 can fix the carrier $PC_1$. On the other hand, the band brake (B/B) 28 can fix the sun gear $S_1$. The low one-way clutch (LO/C) 29 permits rotation of the carrier $PC_1$ in a forward direction (same direction to the rotating direction of the engine output shaft 12) and prevents the carrier $PC_1$ from rotating in a reverse direction (opposite to the rotating direction in a forward direction).

The power train as set forth above has a selectable power transmission mode by a combination of the states of one or more friction elements, i.e. the reverse clutch (R/C) 18, the high clutch (H/C) 20, the forward clutch 22 (F/C), the overrun clutch (OR/C) 24, the low and reverse brake (L&R/B) 26, and the band brake (B/B) 28, to establish various modes of operation of the components of $S_1$, $S_2$, $R_1$, $R_2$, $PC_1$ and $PC_2$ of the first and second planetary gear sets 15 and 16. With various modes of operation of the components of the first and second planetary gear sets 15 and 16, the rotation speed at the output shaft 14 versus the rotation speed at the input shaft 13 is varied at various rates. Active components at respective operational modes of the transmission are illustrated by indicating (o) in respective columns in FIG. 2.

In the shown construction, an apply chamber 11a and a release chamber 11b are defined in the torque converter 10 in order to control the state of the lock-up clutch 11. Namely, when the fluid pressure is supplied to the release chamber 11b, the lock-up clutch 11 is released and when the fluid pressure is supplied to the apply chamber 11a, the lock-up clutch 11 is engaged for establishing a lock-up condition. The band brake (B/B) 28 defines a second speed servo apply chamber 28a, a third speed servo release chamber 28b and a fourth speed servo apply chamber 28c. With this construction, when second speed pressure is supplied to the second speed servo apply chamber 28a, the band brake (B/B) 28 is applied; when the third speed pressure is supplied to the third speed servo release chamber 28b, the band brake is released; and when the fourth speed pressure is supplied to the fourth speed servo apply chamber 28c, the band brake is applied.

FIG. 3 is a block diagram of control unit 300 employed in the preferred embodiment of the transmission control system according to the present invention. The control unit 300 is composed of a microprocessor-based data processing system. The control unit 300 includes an input interface 311, a CPU 313, a ROM 314, a RAM 315 and an output interface 316. These components of the control unit 300 are connected through an address bus 319 and a data bus 320. In addition, the CPU 313 is connected to a reference pulse generator 312. In order to provide various transmission control parameters for enabling the control unit 300, an engine speed sensor 301, a vehicle speed sensor 302, a throttle angle sensor 303, a selector position switch 304, a kick-down switch 305, an idling switch 306, a full load switch 307, a fluid temperature switch 308, an input shaft speed sensor 309, an over-drive switch 310, a brake switch 312 and a parking brake switch 313. are connected to the input interface 311 of the control unit 300.

The engine speed sensor 301 may comprise a crank angle sensor monitoring crankshaft angular position to produce a crank reference signal at every predetermined angular position of the crankshaft and a crank position signal at every predetermined angular displacement of the crankshaft. The engine speed sensor 301 may further comprise an engine speed counter counting up the crank reference signals over a predetermined period for deriving an engine revolution speed to output an engine speed indicative signal N. The vehicle speed sensor 302 has a per se well known construction and thus produces a vehicle speed indicative signal V.

The throttle angle sensor 303 is associated with a throttle valve in an air induction system of an internal combustion engine. The throttle angle sensor 303 monitors the throttle valve angular position and produces a throttle valve angular signal TVO. The selector position switch 304 is associated with a selector lever of the transmission to detect the selector position and where produces a selector position indicative signal SEL representative of the selector position. The kick-down switch 305 is associated with an accelerator pedal to detect depression magnitude of the accelerator pedal greater than a predetermined magnitude to produce a kick-down demand indicative signal.

The idle switch 306 is designed for detecting a fully closed position of the throttle valve to produce an engine idling condition indicative signal. The full load switch 307 is provided for detecting a fully open position of the throttle valve to produce an full load condition indicative signal. The fluid temperature sensor 308 monitors the temperature of the lubricant in the transmission to produce a fluid temperature indicative signal. The input shaft speed sensor 309 monitors rotation speed of the transmission input shaft 13 to produce an input shaft speed indicative signal. The over-drive switch 310 is associated with the selector lever for manual operation for selecting an over-drive or fourth speed ratio enabling state and inhibiting state for producing over-drive enabling state indicative signal when it is enabled. The brake switch 312 is associated with a vehicular brake pedal for detecting application of the brake for producing a braking state indicative signal. Similarly, the parking brake switch 313 detects an application state of the parking brake to produce a parking brake applied state indicative signal.

The sensors, detectors and switches set forth above provide information necessary for performing transmission shifting control. Practical process for transmission shifting control have been disclosed in the aforementioned "Nissan Full-Range Electronically Controlled Automatic Transmission RE4R01A Service Manual". The disclosure of the publications listed hereabove are herein incorporated by reference for the sake of disclosure.

Figures 4, 5:
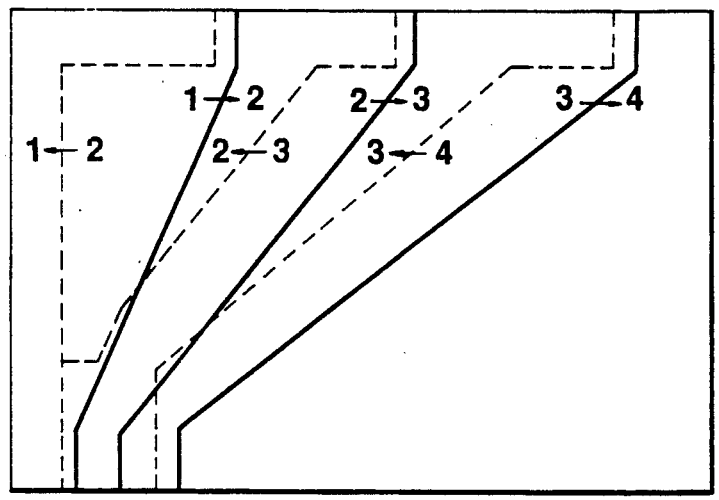
FIG. 4 is a chart showing a shifting pattern in up-shifting and down-shifting of the automatic power transmission of FIG. 1.
FIG. 5 is a chart showing operation of shift solenoids at respective forward speed ratios.

The control unit 300 is so programmed for selecting generally on the basis of the vehicle speed and the throttle valve angular position according to the shift pattern as shown in FIG. 4. In the shifting pattern of FIG. 4, the patterns illustrated by solid line is used for up-shifting of the speed ratio and the pattern illustrated by broken line is used for down-shifting.

Figure 6:
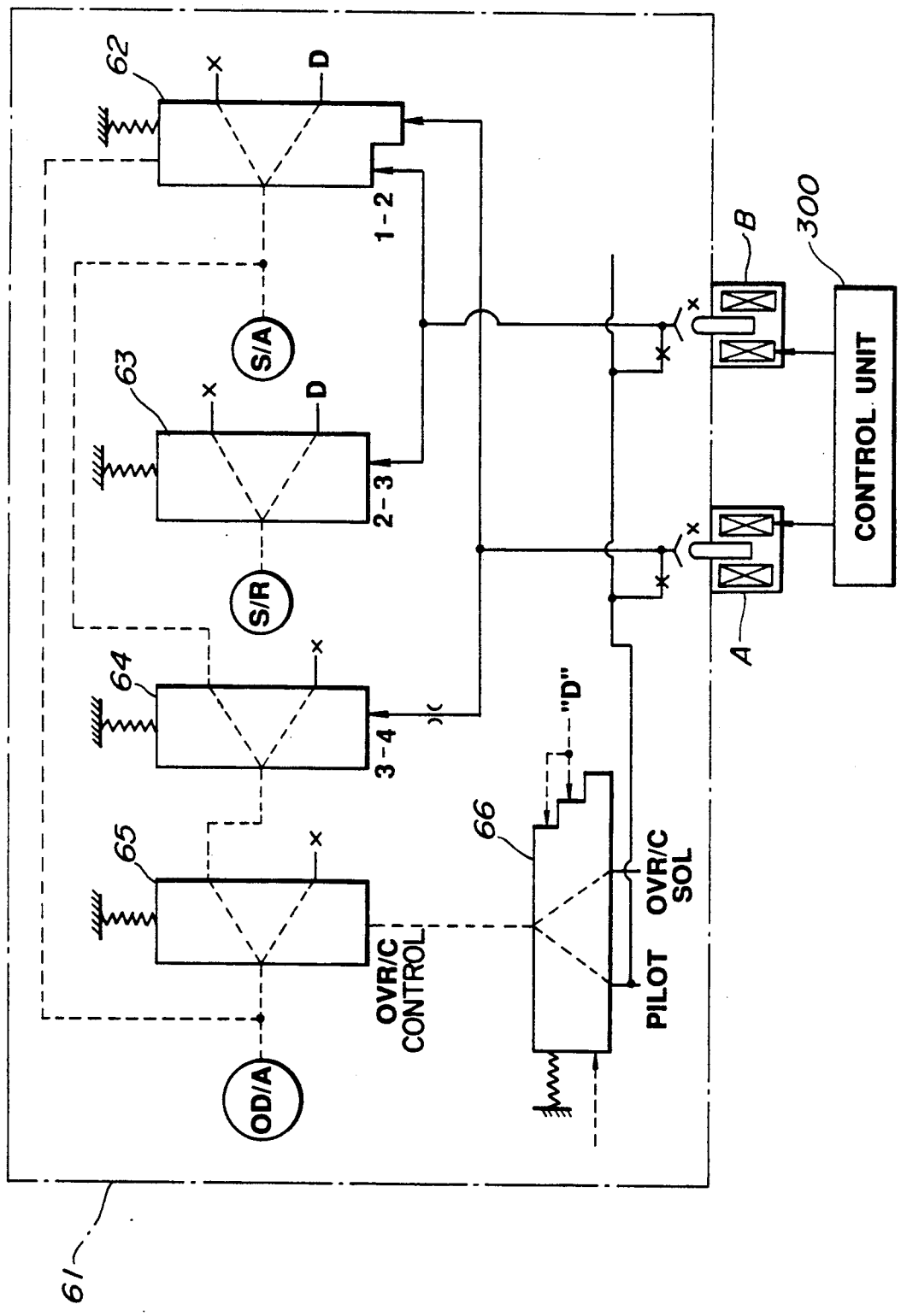
FIG. 6 is a diagrammatic illustration of a shift control section in a hydraulic control unit.

FIG. 6 schematically illustrates the preferred construction of a hydraulic shift control unit 61 employed in the preferred embodiment of the shift control system according to the present invention. As can be seen from FIG. 6, the shown embodiment employs a 1-2 shift valve 62, a 2-3 shift valve 63 and a 3-4 shift valve 64 in place of two shift valves and two timing valves in the prior art set forth above. In addition to the shift valves 62, 63 and 64, an over-run clutch control valve 65 and a shuttle shift valve 66 are employed for performing shift control operation. The aforementioned shift valves 62, 63 and 64 are controlled by first and second shift solenoids A and B. The shift solenoids A and B establish four forward speed ratios by a combination of ON and OFF states as illustrated in FIG. 5. Namely, when both of solenoids A and B are ON, the first speed ratio is selected. When the first shift solenoid A is OFF and the second shift solenoid B is ON, the second speed ratio is established. When both of the first and second shift solenoids A and B are OFF, the third speed ratio is estabished. When the first shift solenoid is ON and the second shift solenoid B is OFF, the fourth speed ratio is established.

In the shown construction, 4-2 shifting is performed via a temporarily selected first speed ratio (1' speed ratio). The temporarily selected first speed ratio is necessitated for draining the third speed servo pressure. Subsequently to the temporary first speed ratio, the second speed ratio is selected to drain the four speed servo pressure. By this sequence, ON-OFF-ON switching action of the band brake 28 can be successfully avoided.

FIG. 7 shows a flowchart showing a shift control routine to be executed by the electronic control unit 300. Shift timing control performed by the control unit 300 will be discussed herebelow with reference to FIG. 7.

Immediately after starting execution, a shifting command which may be entered by the manual selector as detected by the selector position switch 304 or from the full load switch 307, at a step S1. Then, discrimination is made at a step S2 with respect to the read out shift commanded whether the command shifting operation is 4-2 down shifting or not. When the result of discrimination is negative, namely when the entered shift command is for other than 4-2 down-shifting, a normal state shift control operation may be performed according to the shift pattern of FIG. 4, on the basis of the vehicle speed and the throttle valve open angle, at a step S3.

In the normal shift control, both of the shift solenoids A and B are energized (ON) and both of forward clutch 22 and the overrun clutch 24 are engaged when the first speed ratio is selected. When the second speed ratio is selected, the first shift solenoid A is deenergized (OFF) and the second shift solenoid B is energized. At the same time, the pressure is supplied to the second speed servo apply chamber 28a for engaging the band brake 28. If the selected speed ratio is the third speed ratio, both of the first and second shift solenoids A and B are held deenergized. At the same time, third speed pressure is supplied for the high clutch 20 for engaging the latter. Also, the pressure is supplied to the third speed servo release chamber 28b for releasing the band brake 28. Furthermore, when the fourth speed ratio is selected the first shift solenoid A is energized and the second shift solenoid B is deenergized. Pressure is supplied for the fourth speed servo apply chamber 28c for engaging the band brake 28.

It should be appreciated, in the normal shift control operation, when the throttle valve open angle is substantially great, the overrun clutch 24 is released in order to avoid interlocking at the fourth speed ratio.

On the other hand, when the entered shift command is 4-2 down-shifting as checked at the step S2, both of first and second shift solenoids A and B are energized at a step S4 for transition. In response to this, the third speed pressure applied to the high clutch 20 is drained. At this time, the pressure in the third speed servo relief chamber 28b of the band brake 28 is drained through the drain port of the 2-3 shift valve. Therefore, the band brake 28 is held engaged. Subsequently, at a step S5 the first shift solenoid A is energized while maintaining the second shift solenoid B deergized for estabishing the second speed ratio. Then, the fourth speed pressure applied in the fourth speed servo apply chamber 28c of the band brake 28 is drained. At the same time, the forward clutch 22, the overrun clutch 24 and band brake 28 are engaged for establishing the second speed ratio.

As can be seen herefrom, according to the present invention, the number of valves required for the hydraulic control unit can be reduced without causing a problem of shift shock due to lag in the timing of engaging and releasing of the friction elements.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A shift control system for an automatic power transmission comprising:
   a plurality of gear elements selectively engaged and released for selectively establishing a plurality of speed ratios;
   frictional control elements which are hydraulically operable and associated with said gear elements for selectively engaging and releasing said gear elements for establishing a selected one of said speed ratios;
   a hydraulic unit for controlling said frictional control elements upon a command selecting a desired speed ratio, said hydraulic unit including a plurality of shift valves for controlling and selectively supplying control pressure for said frictional control elements;
   a plurality of shift solenoids for operating said shift valves for establishing one of said speed ratios corresponding to said selecting command; and
   an electronic control unit for controlling operation of sail shift solenoids, energizing and deenergizing the latter in combination according to a predetermined shift schedule for estabishing said selected speed ratio, said electronic control unit detecting a specific selecting command requiring a shifting operation between non-consecutive speed ratios, and controlling said shift solenoids for establishing a first combination of an energized solenoid and a deenergized solenoid for establishing a transient, intermediate speed ratio by operating said friction control elements associated with said gear elements to a position corresponding to said transient intermediate speed ratio and subsequently controlling said shift solenoids for establishing a second combination of an energized solenoid and a deenergized solenoid for establishing the speed ratio required by said specific selecting command by controlling said friction control elements associated with said gear elements to a position corresponding to the speed ratio required by said specific selecting command.

2. A shift control system as set forth in claim 1, wherein said hydraulic unit includes first, second and third shift valves for selectively establishing four forward speed ratios, and said plurality of shift solenoids is comprised of first and second shift solenoids, said first, second and third shift valves being operated according to a state of said first and second shift solenoids for establishing a desired speed ratio.

3. A shift control system as set forth in claim 1, wherein said electronic control unit is responsive to a down-shifting command requiring down-shifting from an instantaneous speed ratio to more than one lower speed ratio for performing a down-shifting operation for establishing the selected speed ratio via said transient, intermediate speed ratio.

4. A shift control system for an automatic power transmission comprising:
a plurality of gear elements selectively engaged and released for selectively establishing a plurality of speed ratios;
frictional control elements which are hydraulically operable and associated with said gear elements for selectively engaging and releasing said gear elements for establishing a selected one of said speed ratios;
a hydraulic unit for controlling said frictional control elements upon a command selecting a desired speed ratio, said hydraulic unit including a plurality of shift valves for controlling and selectively supplying control pressure for said frictional control elements;
a plurality of shift solenoids for operating said shift valves for establishing one of said speed ratios corresponding to said selecting command; and
an electronic control unit for controlling operation of said shift solenoids, energizing and deenergizing the latter in combination according to a predetermined shift schedule for establishing said selected speed ratio, said electronic control unit detecting a specific selecting command requiring a shifting operation between non-consecutive speed ratios, and controlling said shift solenoids for establishing a first combination of an energized solenoid and a deenergized solenoid for establishing a transient, intermediate speed ratio by operating said friction control elements associated with said gear element to a position corresponding to said transient intermediate speed ratio and subsequently controlling said shift solenoids for establishing a second combination of an energized solenoid and a deenergized solenoid for establishing the speed ratio required by said specific selecting command by controlling said friction control elements associated with said gear elements to a position corresponding to the speed ratio required by said specific selecting command;
wherein said electronic control unit is responsive to a down-shifting command requiring down-shifting from an instantaneous speed ratio to more than one lower speed ratio for performing a down-shifting operation for establishing the selected speed ratio via said transient, intermediate speed ratio;
wherein said electronic control unit detects a 4-2 shifting command requring down-shifting from a fourth speed ratio to a second speed ratio and performs said down shifting operation to the second speed ratio via a first speed ratio as said transient, intermediate speed ratio.

5. A shift control system for an automatic power transmission comprising:
a plurality of planetary gear sets selectively engaged and released for selectively establishing a plurality of speed ratios;
frictional control elements which are hydraulically operable and associated with said planetary gear sets for selectively engaging and releasing said planetary gear sets for establishing a selected ratio;
a hydraulic unit for controlling said frictional control elements depending upon a command for selecting a desired speed ratio, said hydraulic unit including first, second and third shift valves for controlling and selectively supply control pressure for said frictional control elements;
first and second shift solenoids for operating said shift valves for establishing a selected one of said speed ratios corresponding to a commanded speed ratio; and
an electronic control unit for controlling operation of said first and second shift solenoids for energizing and deenergizing said first and second shift solenoids according to a predetermined shift schedule for establishing the commanded speed ratio, said electronic control unit detecting a specific down-shifting command requiring down-shifting to a speed ratio not consecutive to the instantaneous speed ratio, for controlling said first and second shift solenoids for establishing a first combination of solenoid states for establishing a transient, intermediate speed ratio by operating said friction control elements associated with said planetary gear sets, to a position corresponding to said transient, intermediate speed ratio and for draining control pressure from frictional control elements which are irrelevant for the commanded speed ratio and subsequently controlling said first and second shift solenoid for establishing the speed ratio required by said 6. A shift control system for an automatic power transmission comprising:
a plurality of gear elements selectively engaged and released for selectively establishing a plurality of speed ratios;
frictional control elements which are hydraulically operable and associated with said gear elements for selectively engaging and releasing said gear elements for establishing a selected one of said speed ratios;
a hydraulic unit for controlling said frictional control elements upon a command selecting a desired speed ratio, said hydraulic unit including a plurality of shift valves for controlling said selectively supplying control pressure for said frictional control elements;
a plurality of shift solenoids for operating said shift valves for establishing one of said speed ratios corresponding to said selecting command; and an electronic control unit for controlling operation of said shift solenoids, energizing and deenergizing the latter in combination according to a predetermined shift schedule for establishing said selected speed ratio, said electronic control unit detecting a specific selecting command requiring a shifting operation between non-consecutive speed ratios, and controlling said shift solenoids for establishing a first combination of an energized solenoid and a deenergized solenoid for establishing a transient, intermediate speed ratio by operating said friction control elements associated with said gear elements to a position corresponding to said transient intermediate speed ratio and subsequently controlling said shift solenoids for establishing a second combination of an energized solenoid and a deenergized solenoid for establishing the speed ratio required by said specific selecting command by controlling said friction control elements associated with said gear elements to a position corresponding to the speed ratio required by said specific selecting command;

wherein said electronic control unit is responsive to a down-shifting command requiring down-shifting from an instantaneous speed ratio to more than one lower speed ratio for performing a down-shifting operation for establishing the selected speed ratio via said transient, intermediate speed ratio;

wherein said electronic control unit detects a 4-2 shifting command requiring down-shifting from a fourth speed ratio to a second speed ratio and performs said down shifting operation to the second speed ratio via a first speed ratio as said transient, intermediate speed ratio at which control pressure for a third speed ratio is drained.

* * * * *